J. SCHULER.
INSECT DESTROYER.
APPLICATION FILED NOV. 27, 1918.

1,314,367.  Patented Aug. 26, 1919.

John Schuler, Inventor

By John A. Bommhardt, Attorney

UNITED STATES PATENT OFFICE.

JOHN SCHULER, OF CLEVELAND, OHIO.

INSECT-DESTROYER.

1,314,367.     Specification of Letters Patent.     Patented Aug. 26, 1919.

Application filed November 27, 1918. Serial No. 264,307.

*To all whom it may concern:*

Be it known that I, JOHN SCHULER, a citizen of the United States, residing at Cleveland, in the county of Cuyahoga and State of Ohio, have invented certain new and useful Improvements in Insect-Destroyers, of which the following is a specification.

This invention relates to insect destroyers and is particularly adapted and intended for the destruction of the boll weevil which does so much damage in cotton fields.

The object of the invention is to provide an improved device which by means of a flame will attract the insects, which will be destroyed either by contact with the flame or with the heated vessel which holds the combustible. The device is cheap and can be made in large numbers for use for the intended purpose.

In the accompanying drawing—

Figure 1:
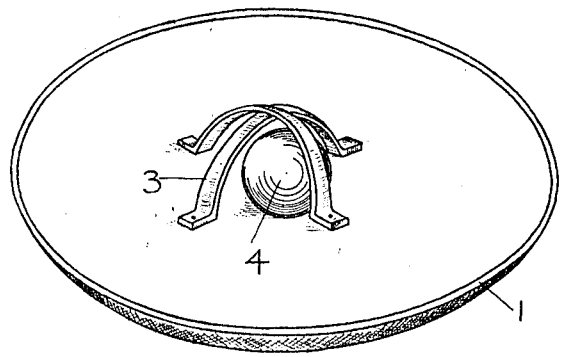
Figure 1 is a perspective view of the device.
Figure 2:
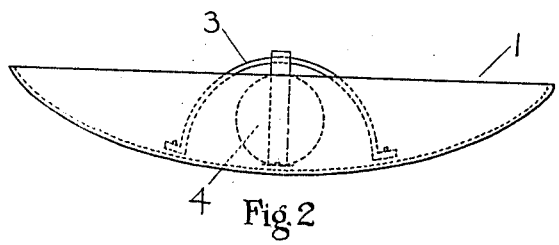
Fig. 2 is a side view.

The device consists of a shallow pan or vessel 1, which may be pressed or stamped from a single piece of sheet metal or the like. This holds the fire ball 4 which may be a ball made of asbestos or the like soaked in kerosene oil. This ball is confined in place by means of a cage consisting of metal straps 3 which are secured at their ends to the dish and are crossed over the ball so that the latter is held in place under all conditions.

In the use of the device, it is placed in the fields and the ball is lighted, and the resulting flame attracts the insects which are either destroyed by the flame, or, if they alight on the hot pan, are killed by contact therewith, the straps 3 serving to conduct the heat of the flame to the pan as well as to confine the ball, as above indicated.

While this device is primarily intended for the destruction of the boll weevil it is readily apparent that it will serve a useful purpose in the extermination of other insects that are a menace to plant life and human comfort. The device can be so cheaply produced that large numbers can be used, and it is capable of repeated use by renewing the kerosene.

I claim:

1. An insect destroyer comprising a shallow pan, a ball of porous non-combustible material thereon, adapted to be soaked in oil or the like, and a cage confining the member on the pan, said cage consisting of crossed straps curved over the ball and fastened at their ends to the pan, most of the upper surface of the pan being unoccupied and exposed for insects to alight thereon.

2. An insect destroyer comprising a pan, an absorbent member therein, adapted to be soaked in oil or the like, and a cage confining said member on the pan, said cage comprising heat conducting straps extending over said member in position to be exposed to the flame thereof and connected to the pan to conduct heat thereto, a considerable area of the pan being exposed beyond the cage for insects to alight thereon.

3. An insect destroyer comprising a shallow pan, a cage located in the central part only of the pan, most of the upper surface of the pan being exposed outside of the cage for insects to alight thereon, said cage being formed of metal straps of sufficient mass to conduct heat to the pan, and a body of oil-absorbent material loosely confined under the cage, in position to heat the same when the oil is burned and thereby heat the outer part of the pan.

In testimony whereof, I do affix my signature in presence of two witnesses.

JOHN SCHULER.

Witnesses:
   JOHN A. BOMMHARDT,
   G. MOSENBERG.